United States Patent [19]
Rhodes

[11] 3,901,396
[45] Aug. 26, 1975

[54] POWER CONTROL HAND TRUCK

[75] Inventor: Chester E. Rhodes, Appleton, Wis.

[73] Assignee: Woodward Mfg. & Sales Co., Inc., Appleton, Wis.

[22] Filed: June 17, 1974

[21] Appl. No.: 480,232

Related U.S. Application Data

[62] Division of Ser. No. 375,908, July 2, 1973.

[52] U.S. Cl. .............................................. 214/152
[51] Int. Cl. ............................................. B60p 1/02
[58] Field of Search ............. 214/370, 515; 280/5.3, 280/47.2, 47.21, 47.28, 47.29; 187/24, 25; 188/83, 166

[56] References Cited
UNITED STATES PATENTS

| | | | |
|---|---|---|---|
| 2,598,489 | 5/1952 | Bayer et al. | 214/515 |
| 2,895,567 | 7/1959 | Hall | 187/24 |

Primary Examiner—Albert J. Makay
Attorney, Agent, or Firm—Dominik, Knechtel, Godula & Demeur

[57] ABSTRACT

An electrically powered, two wheeled hand truck having telescoping frame parts, the inner frame part being raised and lowered by electric power means in the form of a rotatable screw shaft which engages a bearing nut fixed to the inner movable frame part. Rotation of the screw in a particular direction either lowers or raises the inner frame part. A DC motor is carried by the hand truck and powered by a battery voltage source also carried by the hand truck. Electrical switching means select the direction of rotation of the screw shaft for lowering or raising the inner movable frame part. Rapid and accurately controlled raising and lowering allows moving a load carried on the movable frame part from a raised position to a lowered position and vice-versa. A braking means holds the screw shaft when the motor is turned off so that the load does not slip. Starting the motor overrides the braking means to either raise or lower the load.

4 Claims, 15 Drawing Figures

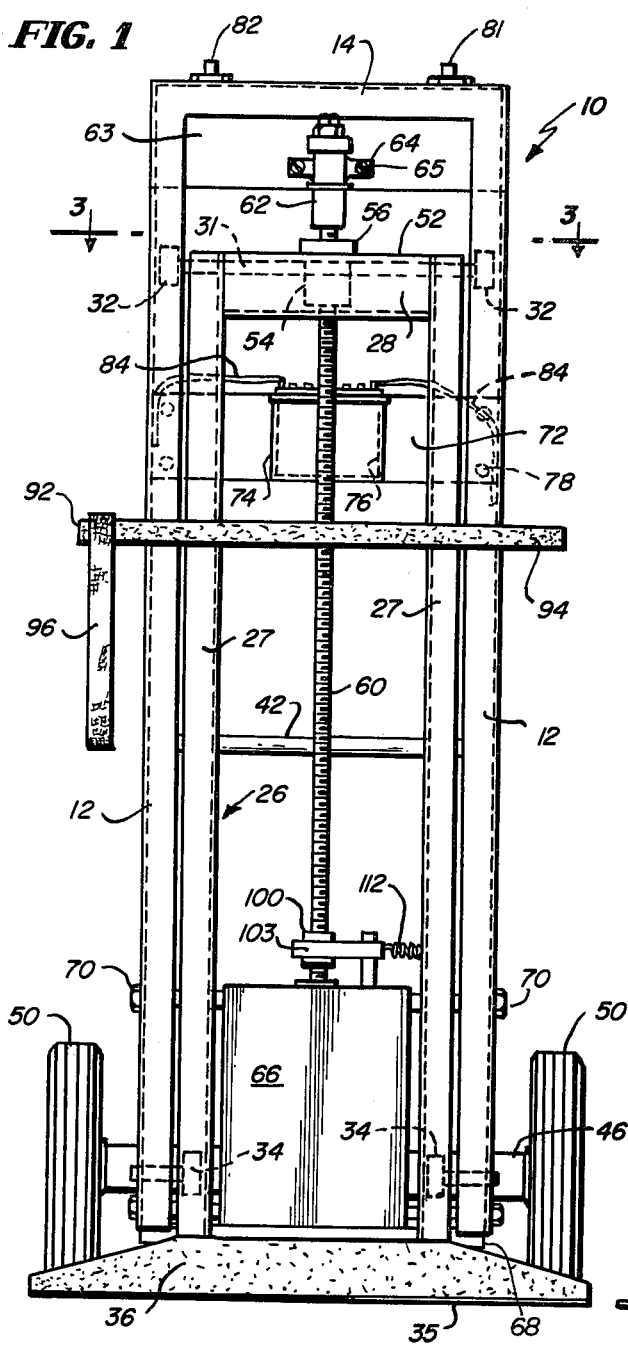
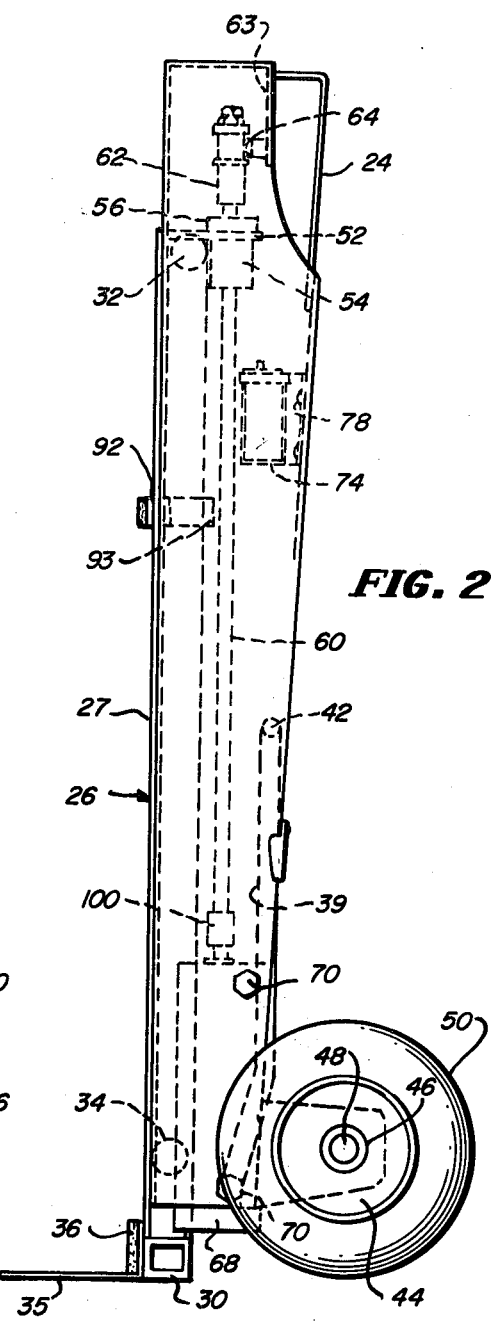
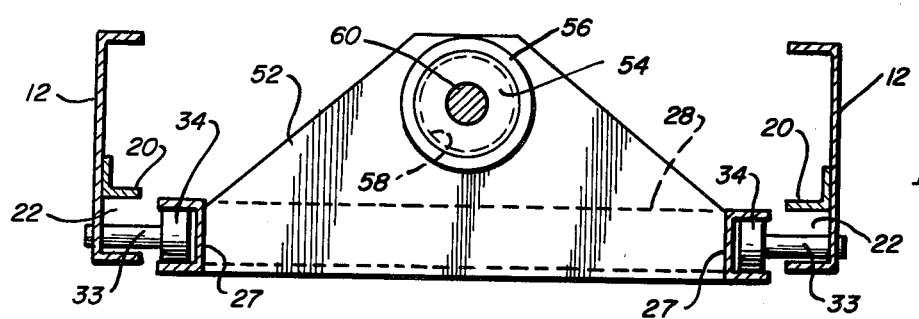

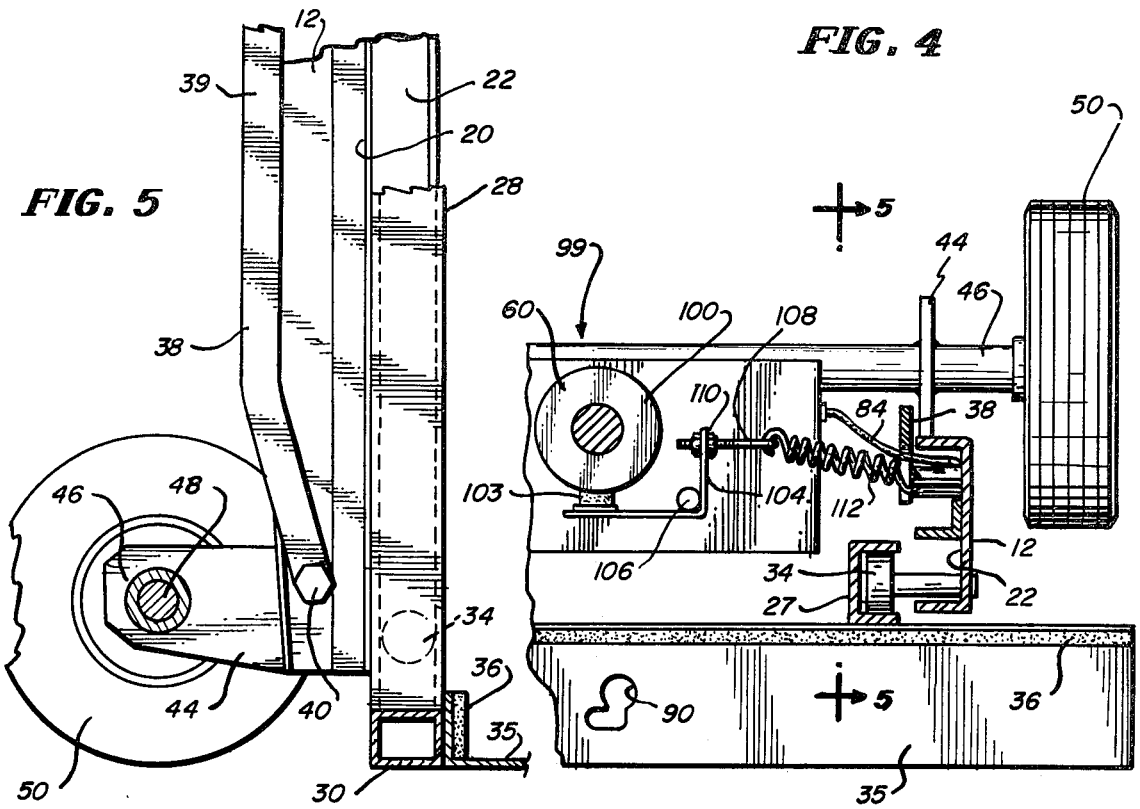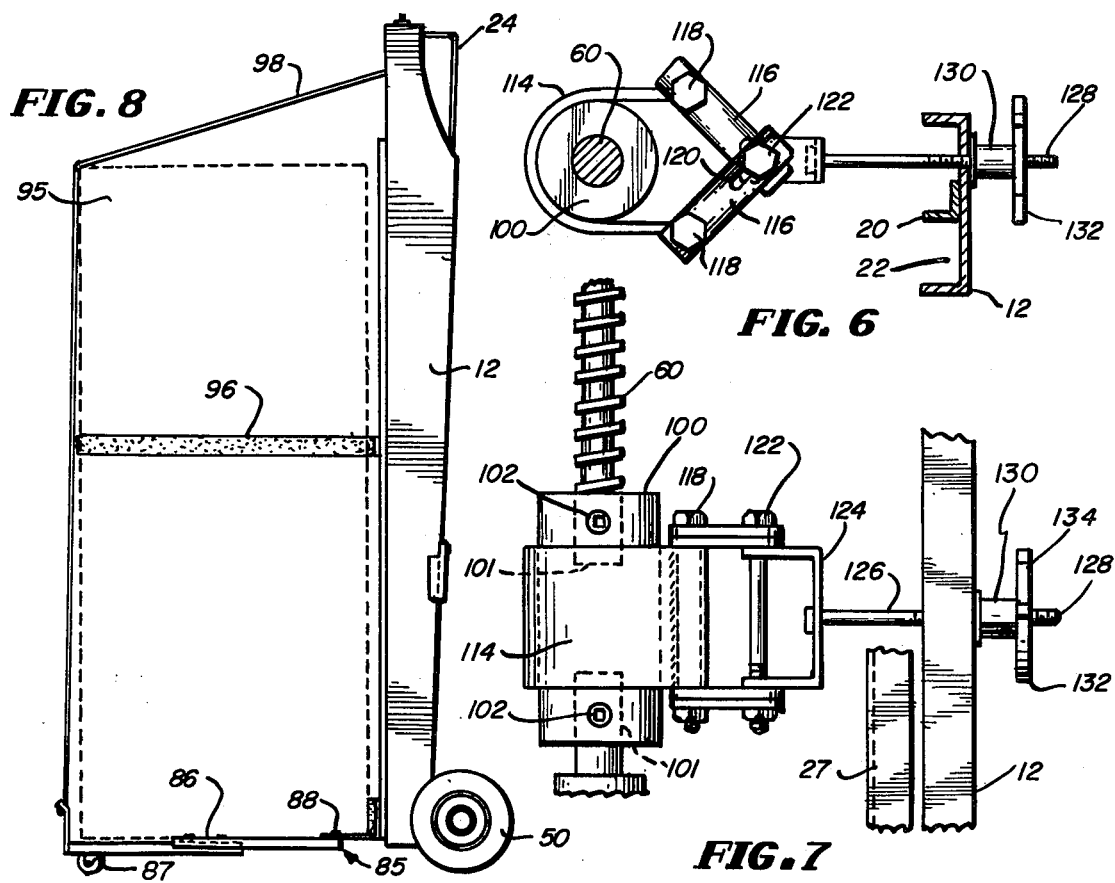

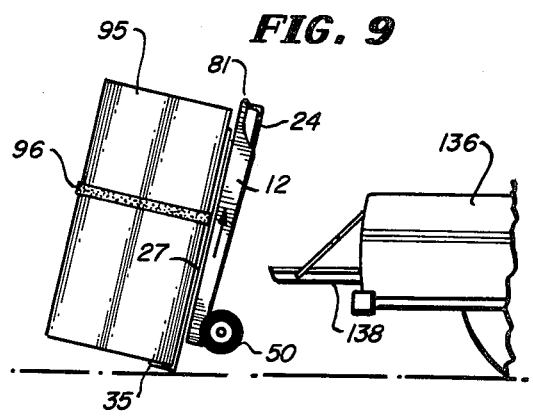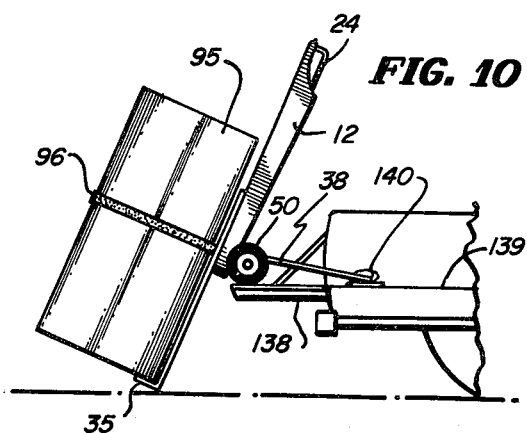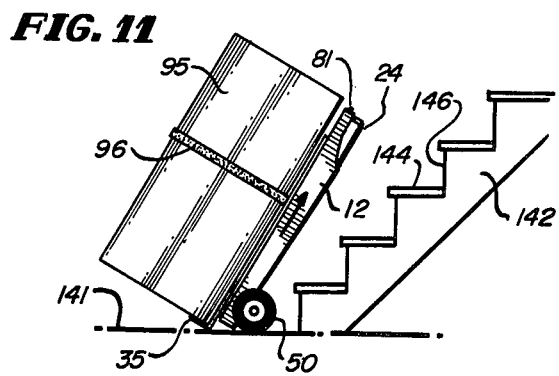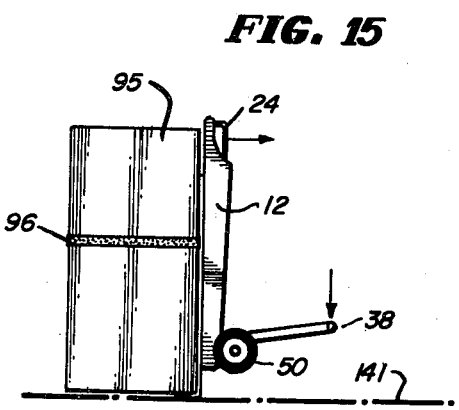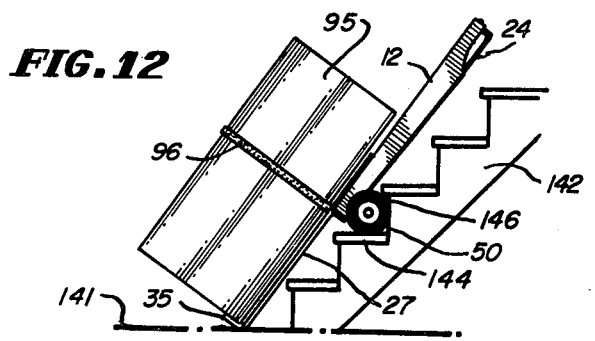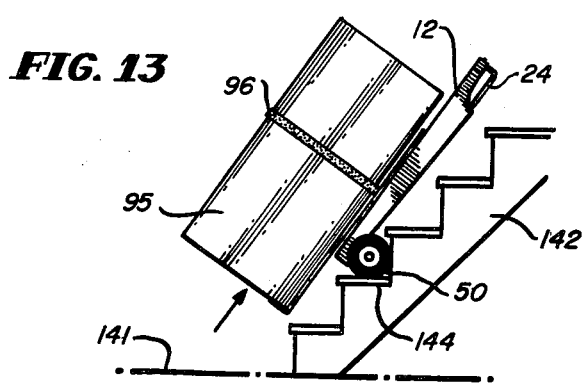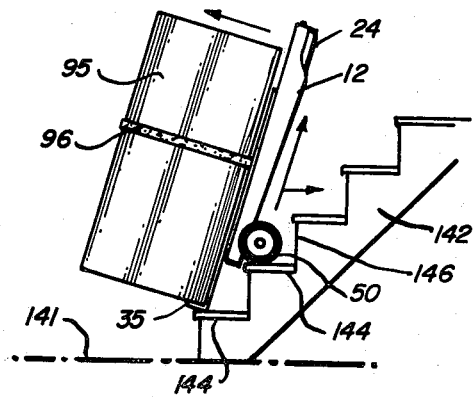

POWER CONTROL HAND TRUCK

This application is a division of application Ser No. 375,908 filed July 2, 1973.

This invention relates to an improved two wheeled hand truck which is electrically powered to raise and lower a frame part in a telescoping frame assembly. The invention particularly relates to a self contained, electrically powered two wheeled hand truck in which a load carried on a frame part is quickly and accurately lowered and raised to preselected levels through the control of precisely reliable switching means.

Various efforts have been made in the art to facilities the use of two wheeled hand trucks for lifting and carrying loads. Various mechanical features have been adapted to allow such hand trucks to operate more easily in lifting and carrying loads. It is recognized that other power means have been used including hydraulic and electrical. It is appreciated that such various mechanical and power embodiments should be reliable in operation, economical, accurate, and be operable in fairly rapid fashion.

One approach in pursuit of these advantages was disclosed by the present applicant in his previously issued U.S. Pat. No. 2,904,201. The Rhodes patent disclosed a two wheel hand truck having telescoping frame parts, an inner movable frame part and an outer stationary frame part. The inner was movable by a rack and pinion assembly which the operator manipulated to raise or lower the inner frame part. Such patent to Rhodes further disclosed a hook bar in which an elongated member was connected by pivoted links to the outer frame member. Such hook bar engaged a hook in a truck bed to hold the two wheel hand truck while raising and lowering heavy loads. One problem encountered with the earlier Rhodes hand truck was the inconvenience encountered in operating the rack and pinion, particularly the labor and time involved to raise and lower the loads. This limited the potential utility of such a two wheeled hand truck.

It is one object of the present invention to provide an improved two wheeled hand truck which is a self powered by an electrical package which includes reliable, efficient and quickly operating means for raising and lowering a frame part with carried loads.

Another object of the invention is an improved two wheeled hand truck with self contained direct current electric motor powered by carried batteries which operate a screw shaft that can efficiently raise and lower heavy loads with precise accuracy, as well as rapidity.

Yet another object of the invention is an improved two wheeled, self powered hand truck in which an electically operated screw shaft can be braked to hold a carried load in a moved position when the electric power is disconnected, but which electric power readily overrides a such braking function to resume selected lowering or raising of heavy loads with rapidity and precision.

Still another object of the present invention is an improved two wheeled hand truck provided with self contained electric power means which allow the hand truck with carried loads to move up and down stairs quickly, safely, and reliably.

Another object of the invention is an improved two wheeled hand truck which is self powered by a direct current motor and a battery voltage source, and which allows an operator to quickly balance carried loads by raising and lowering to obtain the best tilting position. An aspect of this object is the further utilization of a U-shaped hook bar which can be lowered to operative position and operated by the foot of the user to obtain maximum leverage for tipping particularly heavy or low slung loads on the hand truck. Such a hook bar is ordinarily used for anchoring the hand truck to a hook in the bed of a truck when lowering or raising heavy loads from or on the truck.

Another object is an improved method for raising and lowering loads, particularly up and down stairs, by utilizing rapid and reliable lowering and raising, as well as improved braking during non-operation of the electrical power means which is provided on a two wheeled hand truck.

Another object of the invention is an improved two wheeled hand truck, self contained with an electric power package, and with auxiliary features to facilitate load carrying such as repositionable strap bars, bottom caster members, and other features that will become apparant to practitioners.

The above objects are now attained, together with still other objects which will occur to practitioners, by the invention of the following disclosure, including drawings wherein:

FIG. 1 is a front elevational view showing the self powered hand truck;

FIG. 2 is a side elevational view of the hand truck shown in the view of FIG. 1;

FIG. 3 is a sectional view taken along line 3—3 of FIG. 1;

FIG. 4 is a portional sectional view of the hand truck showing a brake assembly;

FIG. 5 is a sectional view taken along line 5—5 of FIG. 4;

FIG. 6 is a top plan view partly in section, of an alternative braking assembly;

FIG. 7 is a side elevational view of the braking assembly shown in the view of FIG. 6;

FIG. 8 is a side elevational view of the self powered hand truck with a load indicated by broken lines, shown together with a bottom caster assembly;

FIGS. 9 and 10 are somewhat schematic views to illustrate the method by which a load is transferred by the truck to a raised position onto the bed of a truck;

FIGS. 11-14 illustrate somewhat schematically the method for moving a load up and down a stair case with the self powered, two wheeled truck; and FIG. 15 illustrates somewhat schematically a means for facilitating the tilting of a load into carrying position for the truck.

Looking first at FIGS. 1–3, there is seen a two wheeled hand truck having a telescoping frame member including an outer frame member 10 having spaced side walls channels 12 which are slightly tapered from top to bottom. The outer frame member has a top channel cross member 14. Each spaced side channel has a dividing angle 20 which defines a small outer track 22 with one of the upright arms of channel 12, and a larger space with the opposite upright arm of the channel 12. Angular rod grips 24 are mounted to the side channels 12, and locked therein by welds or the like.

An inner frame member 26 includes spaced side channel member 27 and a cross top channel member 28. A bottom channel member 30 completes the rectangular configuration of the inner frame member 26.

An inner frame shaft 31 is fixed to top channel member 28, and rollers 32 are rotatably mounted to the opposite ends of shaft 31. Such rollers bear against spaced channel sides 12, particularly in track 22. The bottom of each of the spaced side channels of the outer frame member are provided with outer frame shafts 33 to which rollers 34 are rotatably mounted. Rollers 34 are disposed to engage the track in spaced side channels 27, as better seen in the view of FIG. 3.

An angular toe plate 35 is mounted to the front face of the bottom channel member 30. The upright or vertical face of the toe plate is provided with a cushion pad 36 to protect loads held by the toe plate. A generally U-shaped hook bar 38 is pivotally mounted to the outer frame part, and such hook bar includes side arms 39 connected at pivots 40 to the insides of side channels 12. A cross arm 42 joins the side arms 39 and the hook bar is pivoted to operative position behind the hand truck. The hook bar is raised to inoperative position between the spaced sides 12 of the outer frame member. Wheel brackets 44 are fixed to the spaced sides 12 of the outer frame part, and an axle housing 46 extends between said wheel brackets. An axle shaft 48 is within axel housing 46, and wheels 50 are rotatably mounted to the ends of the axel shaft.

The top channel cross member 28 of the inner frame part has a support plate 52, shown as trapezoidal, fixed to the top thereof by welds or the like. The support plate 52 pulls a bearing nut member 54 which is held to the plate 52 by a locking ring 56 which is threadably engaged at 58 to the bearing nut 54. An elongated screw shaft 60 engages the bearing nut, one end of said screw shaft being journalled freely in a screw bearing 62 which is mounted to a transverse support wall 63 of the outer frame part by bearing bracket 64. Fasteners 65 hold bracket 64 to wall 63. The opposite end of screw shaft 60 is connected to a DC electrci motor 66 which is positioned between the spaced channel sides 27 of the inner frame part. A transverse motor support member 68 is provided generally between the spaced sides 12 of the outer frame part, although motor support 68 is wider than the sides 12 to support the bulk of the electric motor. A plurality of motor mount connectors 70 are shown extending between the space sides 12 of the outer frame part and the casing of the electric motor 66.

A battery support member 72 is shown extending between the space sides 12 of the outer frame member. The support member 72 is provided with a battery pocket 74 on one side, and a battery 76 is shown deposited in such a pocket. The support member is fixed to the space sides 12 by fasteners 78. Leads 84 are shown in part extending from the terminals of the battery 76, and such leads are connected to the DC electric motor 66. The top cross channel member 14 of the outer frame part is shown with electrical switching means, including an up switch 81 and a down switch 82. Switch 81 actuates the electrical power means to load up position, or to raise the movable inner frame to the position shown in the views of FIGS. 1 and 2. The down switch 82 actuates the electrical power means to load down position wherein the inner frame part is lowered beyond the bottom of the stationary outer frame part. Switches 81 and 82 operate the screw shaft 60 in opposite rotational directions for either such up or down movement of said inner frame part. The rotating screw shaft 60 induces movement of the bearing nut 54 in the usual way so that such moving bearing nut moves the inner frame part to which it is affixed.

The view of FIG. 8 shows the hand truck fitted with an elongated bottom caster member 85. The elongated caster member is shown in two parts with an intermediate telescoping portion 86 to vary its lengths. One end of the elongated caster member is provided with a caster 87 mounted to the under side of the member, and the opposite end is provided with a flanged locking pin 88 (not shown in large detail) for engaging key slot 90 in the toe plate 35.

The front of the hand truck is shown with a strap bar 92 which is positionable along the length of the telescoping frame parts. The opposite ends of the strap bar have locking angles 93 which are dimensioned to frictionally lock against the insides of spaced channel sides 27 when the long axis of the strap bar is horizontal to the transverse axis of the toe plate 35. The locking angles are released by pivoting the strap bar about its central portion, whereby the titled strap bar is moved along the frame parts and locked by again assuming a horizontal position relative to the toe plate. The front face of the strap bar is provided with a pad or cushion 94 which is aligned generally with the cushion 36 of the toe plate so that aligned support points are provided for a load such as an appliance 95. A strap 96 is wrapped around the appliance, its length being adjusted by means not shown, and then tied to the strap bar by means which are also not shown. Strap 96 is a side to side strap with respect to the frame parts, and an additional top to bottom strap 98 is shown tied to the end of the elongated caster member 85 and to the top of the outer frame part by means which are not shown.

The screw shaft 60 operates to particular advantage for raising or lowering loads because of cooperation with a brake assembly shown generally as 99. Looking at the view of FIG. 7, the screw shaft 60 has spaced parts which are mounted to the opposite ends of a brake drum 100. Each part of the screw shaft is fitted in a screw socket 101 and held therein by fasteners 102. Looking now at the view of FIG. 4, a brake shoe 103 contacts the drum 100, said brake shoe being urged against drum 100 by an angle arm 104 which is turned around pivot pin 106. And eye bolt 108 is connected to an arm of the angle 104 by nut fasteners 110. A spring 112 is connected at one end to the eye bolt 108 and the other end is connected to a bracket affixed to side channel 12. The spring 112 urges angle arm into clockwise rotation to thereby urge shoe 103 against drum 100. The frictional contact of the brake shoe with the brake drum is sufficient to hold the loads for which the hand truck is designed when the direct current motor is not operating. When such motor is turned on, it overrides the braking action of the shoe against the drum to lower or raise the load.

An alternate braking assembly is shown in the view of FIGS. 6 and 7. The braking shoe is shown as a flexible strap 114 which is wrapped around drum 100. Toggle links 116 are joined by pivot connections 118 to the opposite ends of the strap 114. Each of the lengths is provided with elongated links slots 120, and a pivot 122 joins the links to a yoke element 124. A bolt 126 is connected to the yoke element, and the threaded end 128 of the bolt is provided with a spacer collar 130 and a disc handle 132. The disc has a plurality of finger indents 134. This alternative embodiment allows the frictional contact of the shoe with the drum to be adjusted by manually turning the disc handle 132. The embodiment shown in FIG. 4 is preset with the respect to the frictional contact with the drum by the fasteners 110.

In operation, a load such as an appliance 95 is strapped on to the frame member and supported on the toe plate 35. Looking first at FIG. 10, a load is lowered from a truck 136 which has its tail gate 138 lowered as shown. The bed 139 of the truck is provided with a bed hook 140 which anchors the hook bar 38 of the hand truck. The down switch 82 (not shown in these views) is operated to lower the load 95 to contact the ground surface 141. After ground contact, the hook bar 38 is released from the hook 140 and repositioned between the side channels 12 of the outer frame part. The hand truck is then tilted forward so that wheels 50 clear the end of tailgate 138, and the hand truck is lowered by actuating the up switch 81. Since the load is fully lowered with the movable frame, the hand truck can only move downwardly until the wheels 50 contact the ground surface 141 and the frame is in its starting position relative to the wheels as shown in the earlier views of the drawing. To lift a load onto a truck, the hand truck is positioned relative to tailgate 138 so that the wheels 50 clear the end of the tailgate upon lifting. The load down switch 82 is operated to raise the outer frame part 12 as a result of the reaction from the movable frame part contacting the fixed ground surface 141. The wheels are placed on the tailgate and the hook bar 38 then engages the hook 140 to anchor the hand truck. Actuating the load up switch 81 then raises the load onto the tailgate whereafter the hook bar is disengaged from the hook on the bed 139 of the truck.

The sure and rapid control of the electrical power means allows the hand truck to be used to particular advantage in carrying loads up and down stairs. The truck is positioned at the foot of the stair case 142 so that the wheels 50 can clear the front edges of the stair treads 144. Actuating the load down switch raises the truck to a stair level, shown here as stair number 2. The wheels 50 rests on the stair tread 144 and against the stair riser 146. The up electrical switch is then operated to move the inner frame member so that the toe plate rests on the tread of the immediately preceeding stair, stair number 1. The load is tilted forward, the down switch is actuated, and the wheels are raised to the level of another stair tread, whereupon the truck is tilted backwards so the wheel engages the tread and riser, say on stair number 4. Again, the load is moved to clear the front edges of the stair tread, and then raising the load so it rests on the tread of stair number 3. The procedure is repeated until the load is carried to the top of the stairs.

The reverse procedure is followed in carrying the load down the stairs. From the top of the stairs, the load down switch is operated to lower the load so that toe plate contacts the tread of stair number 3. The load on the truck is pushed forward to allow the wheels 50 to clear the tread, and thereafter the load up switch is operated to lower the wheels to the tread of stair number 4. The procedure is repeated until this load is carried down the stairs. The load is therefore carried up and down the stairs by simply operating the electrical switches and the power so that the load is precisely raised or lowered to a predetermined location. Otherwise, the load is simply tilted or moved to clear the stairs.

The claims of the invention are now presented and the terms in such claims may be further understood by reference to the language of the preceding specification and the views of the drawing.

What is claimed is:

1. A method for carrying a load upstairs on a two wheeled hand truck having electric power means for moving a telescoping frame part relative to another frame part, which includes the steps of placing the wheels alongside a first stair, pushing the load forward to sufficiently allow the wheels to move past the first stair tread, actuating the electric power means to lower a frame part and the carried load to make contact with the ground and thereby raising the wheels to contact a stair tread above the first stair, braking the load when the electric motor is rendered inoperative to move the load, tilting the load away from the stairs to allow said load to move to the stair tread on which the wheels rest without obstruction, actuating the electric power means to release the braking means and to raise the movable frame part and the load to the level of the stair tread on which the wheels are positioned, and repeating the sequence until the load climbs the stairs to a desirable level.

2. A method which includes the steps of claim 1 wherein said electric power means moves and inner frame part relative to an outer frame part, and wherein said electric power means includes an electric motor operating drive means to raise and lower said inner frame part.

3. A method for carrying a load downstairs on a two wheeled hand truck having an electric power means for moving a telescoping frame part relative to another frame part which includes the steps of placing the wheels on a stair tread, positioning the load so it can move without obstruction to a stair tread at a lowered level, actuating the electric power means to lower a frame part and the carried load to make contact with said stair tread at a selected lower level, braking the load when the electric power means is rendered inoperative to move the load, tilting the load away from the stairs so that the wheels clear the stair tread on which the wheels were originally positioned, actuating the electric power means to release the braking means and to raise the inner frame part and thereby lower the wheels to the same tread on which the load has been placed, and repeating the sequence until the load is moved down the stairs to a selected level.

4. A method which includes the steps of claim 3 wherein said electric power means moves an inner frame part relative to an outer frame part, and wherein said electric power means includes an electric motor operating drive means to raise and lower said inner frame part.

* * * * *